United States Patent
Marquez

(10) Patent No.: US 9,758,303 B2
(45) Date of Patent: Sep. 12, 2017

(54) PICK TO LIGHT SYSTEM

(71) Applicant: Flextronics AP, LLC, Broomfield, CO (US)

(72) Inventor: Fernando Antonio Sanchez Marquez, San Jose, CA (US)

(73) Assignee: Flextronics AP, LLC, Broomfield, CO (US)

( * ) Notice: Subject to any disclaimer, the term of this patent is extended or adjusted under 35 U.S.C. 154(b) by 126 days.

(21) Appl. No.: 14/171,676

(22) Filed: Feb. 3, 2014

(65) Prior Publication Data

US 2015/0217937 A1 Aug. 6, 2015

(51) Int. Cl.
*G06F 7/00* (2006.01)
*B65G 1/137* (2006.01)

(52) U.S. Cl.
CPC .................. *B65G 1/1373* (2013.01)

(58) Field of Classification Search
USPC ........................................ 700/216
See application file for complete search history.

(56) References Cited

U.S. PATENT DOCUMENTS

| 5,315,508 A * | 5/1994 | Bain | G06K 17/00 700/90 |
| 8,571,702 B1 * | 10/2013 | Haake | G06Q 10/047 700/213 |
| 2001/0018669 A1 * | 8/2001 | Fujiwara | G06Q 30/06 705/26.81 |
| 2002/0087231 A1 * | 7/2002 | Lewis | B65G 1/1373 700/230 |
| 2004/0068443 A1 * | 4/2004 | Hopson | G06Q 10/02 705/5 |
| 2013/0211977 A1 * | 8/2013 | Lyon | G06Q 10/0875 705/29 |
| 2013/0238463 A1 * | 9/2013 | Nishida | G06Q 30/0609 705/26.35 |

OTHER PUBLICATIONS

Warehouse Automation, iPad Pick List, Barcodes, Camera & Inventory Systems + St Tropez Jet, Oct. 22, 2013, www.philsuslow.com, 2 pages.
"RFID-enabled two-bin replenishment", Oct. 22, 2013, www.logi-d.net/what-we-do/supply-management/general-supplies/, 2 pages.
"Pick-to-Light Basics", Oct. 22, 2013, www.lightingpick.com/picktoLightBasics.html., 2 pages.
"BinFlag Stock Indicator", Oct. 22, 2013, http:/twinbin.com/products/binflag-stock-indicator/, 2 pages.

* cited by examiner

*Primary Examiner* — Kyle Logan
(74) *Attorney, Agent, or Firm* — Haverstock & Owens LLP

(57) ABSTRACT

A method of and device for generating an identifiable signal to facilitate an order picking process are disclosed. The method and device can be used on an order picking station having containers with items to be picked. In some embodiments, the station has multiple shelves having signal generating devices coupled with each of the containers on the shelves. The device takes the information of the items to be picked and generate identifiable signals, such that the device provides visual effects to facilitate workers' picking and gathering efficiency.

20 Claims, 3 Drawing Sheets

PICK TO LIGHT SYSTEM

CROSS-REFERENCE TO RELATED APPLICATION(S)

This application claims priority under 35 U.S.C. §119(e) of the U.S. Provisional Patent Application Ser. No. 61/760,588, filed Feb. 4, 2013 and titled, "PICK TO LIGHT SYSTEM," which is also hereby incorporated by reference in its entirety for all purposes.

FIELD OF THE INVENTION

The present invention relates to the field of operational optimization. More specifically, the present invention relates to product inventory and assembly.

BACKGROUND OF THE INVENTION

Typically, a factory or a supply chain worker needs to search and count the material according to a picking list. The process of dispensing materials constitutes one of the most inefficient parts of the overall logistic process.

SUMMARY OF THE INVENTION

A method of and a device for optimizing the logistic system. The method and device can be used on an order picking station having containers with items to be picked. The station can have multiple shelves having signal generating devices coupled with each of the containers on the shelves. The device takes the information of the items to be picked and generate identifiable signals, such that the device provides visual effects to facilitate workers' picking and gathering efficiency.

In an aspect, an inventory picking system comprises a picking list information receiving device, a picking list information processing device coupled with the picking list information receiving device, one or more indicating devices coupled with each of the dispensing containers, and an indication of a number of items to be picked shown on the one or more indicating devices associated with one or more selected containers. In some other embodiments, the picking list receiving device comprises a bar code reader. In other embodiments, the picking list receiving device comprises a camera. In some other embodiments, the picking list receiving device comprises an order processing software. In some embodiments, the picking list information processing device converts information of the picking list to an identifiable signal at the one or more indicating devices. In other embodiments, the identifiable signal comprises a numerical number. In some other embodiments, the identifiable signal comprises a lighting effect. In some embodiments, the lighting effect indicates that a needed quantity is obtained. In other embodiments, the lighting effect indicates that a needed quantity is less than a quantity obtained. In some other embodiments, the lighting effect indicates that a needed quantity is more than a quantity obtained. In some embodiments, the dispensing container comprises a sensing device sensing a quantity of the item remained in the dispensing containers. In other embodiments, the dispensing container comprises a sensing device sensing a quantity of the item that is removed from the dispensing container.

In another aspect, an order fulfilling method comprises receiving an order with one or more items to gather, generating an identifiable signal on a selected location on a stocking shelf, and changing the identified signal once a quantity needed for the one or more of the items is retrieved. In some embodiments, the order is entered via a bar code reader. In other embodiments, the identifiable signal comprises a LED lighting effect. In some other embodiments, the identifiable signal comprises a number. In some other embodiments, the changing comprises turning off.

In another aspect, an order fulfilling apparatus comprises a working station, one or more shelves on the working station, containers on the one or more shelves, a numerical indicating device associated with each of the containers, and an information processing device configured to generate an identifiable signal on the numerical indicating device. In some embodiments, the apparatus further comprises a picking order sorting device configured to generate a picking list that improves picking efficiency. In some other embodiments, the picking list generated is determined based on the physical distance among the containers.

Other features and advantages of the present invention will become apparent after reviewing the detailed description of the embodiments set forth below.

BRIEF DESCRIPTION OF THE DRAWINGS

Embodiments will now be described by way of examples, with reference to the accompanying drawings which are meant to be exemplary and not limiting. For all figures mentioned herein, like numbered elements refer to like elements throughout.

DETAILED DESCRIPTION OF THE PREFERRED EMBODIMENT

Reference is made in detail to the embodiments of the present invention, examples of which are illustrated in the accompanying drawings. While the invention is described in conjunction with the embodiments below, it is understood that they are not intended to limit the invention to these embodiments and examples. On the contrary, the invention is intended to cover alternatives, modifications and equivalents, which can be included within the spirit and scope of the invention as defined by the appended claims. Furthermore, in the following detailed description of the present invention, numerous specific details are set forth in order to more fully illustrate the present invention. However, it is apparent to one of ordinary skill in the prior art having the benefit of this disclosure that the present invention can be practiced without these specific details. In other instances, well-known methods and procedures, components and processes have not been described in detail so as not to unnecessarily obscure aspects of the present invention. It is, of course, appreciated that in the development of any such actual implementation, numerous implementation-specific decisions must be made in order to achieve the developer's specific goals, such as compliance with application and business related constraints, and that these specific goals are vary from one implementation to another and from one developer to another. Moreover, it is appreciated that such a development effort can be complex and time-consuming, but is nevertheless a routine undertaking of engineering for those of ordinary skill in the art having the benefit of this disclosure.

Figure 1:
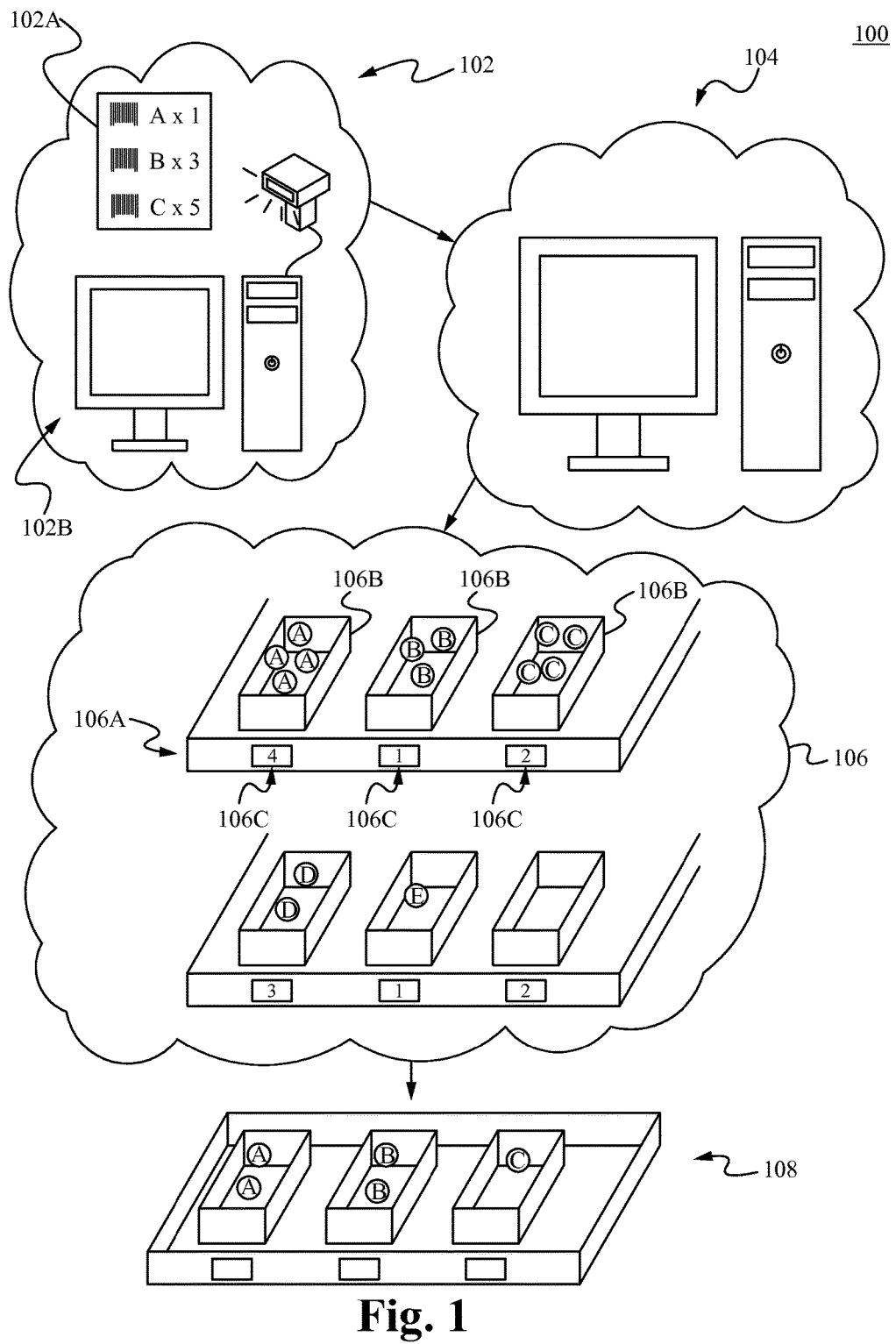
FIG. 1 illustrates a pick to light system in accordance with some embodiments of the present invention.

FIG. 1 illustrates a pick to light system 100 in accordance with some embodiments of the present invention. In some embodiments, the pick to light system comprises a picking list reading and/or generating part 102, an information processing part 104, an inventory part 106, and an order box 108. The picking list reading and generating part 102 can comprise a bar code scanner 102A, an inquiry receiving device 102B. The picking list received and/or generated at the part 102 can be pushed to and/or pulled by the information processing part 104, which can be a computer or a server in some embodiments. The picking list processed at the information processing part 104 can be executed and/or performed at the inventory/picking part 106 according to the execution command, orders, and/or sequences generated by the information procession part 104. A worker or an automated machine can pick up the goods/parts according to the processed picking list on the inventory/picking rack 106 to be placed in the shipping bin/order box 108.

Figure 2:
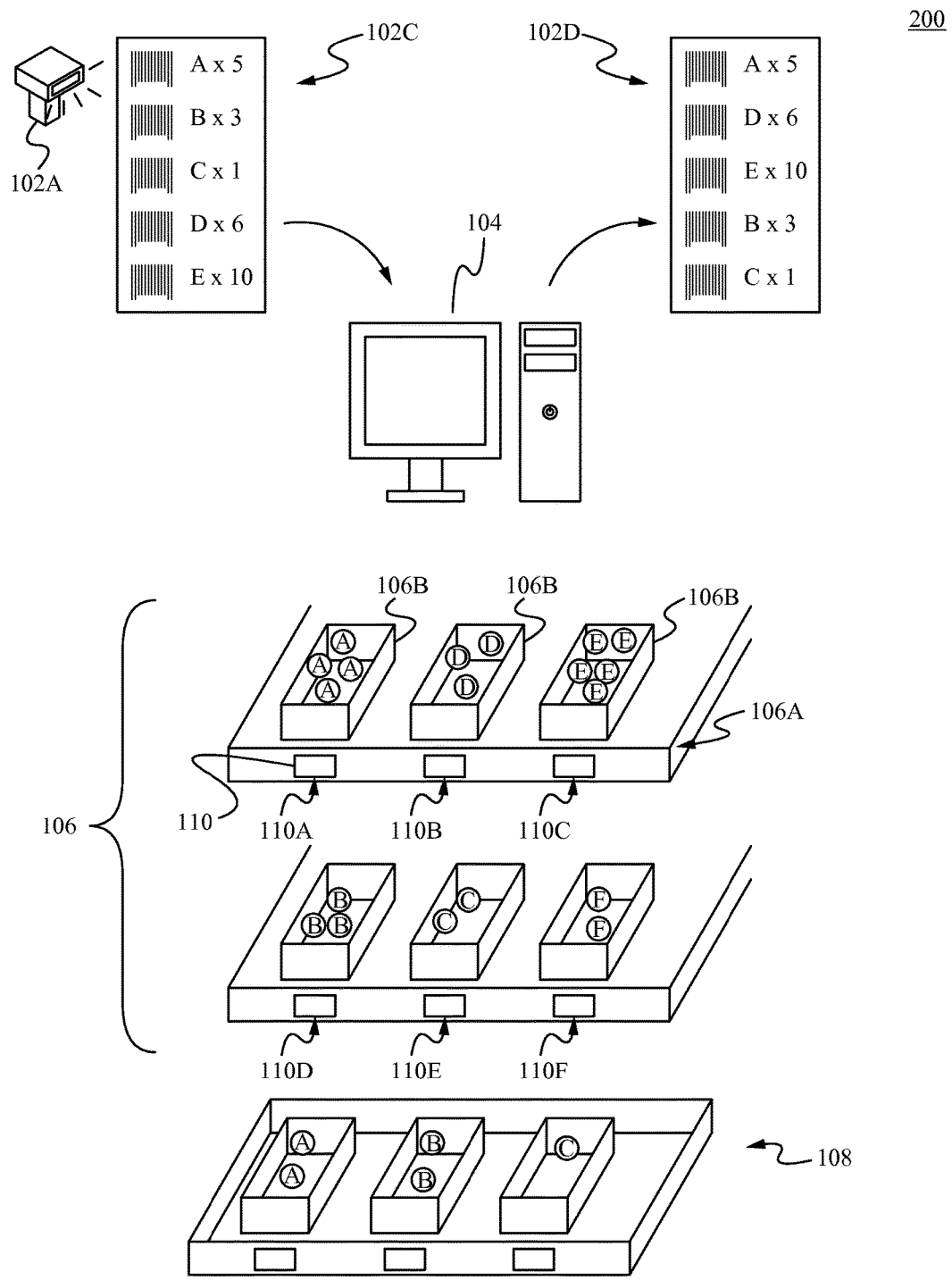
FIG. 2 illustrates a picking list processing method in accordance with some embodiments of the present invention.

FIG. 2 illustrates a picking list processing method 200 in accordance with some embodiments of the present invention. The picking list 102C can comprises items (such as, item A-E) to be picked up. The picking list 102C can be read by a bar code reader 102A. The bar code reader can be any quantity information that is formatted in any human or computer readable information, such as a bar code, a QR code, a sound, or a color pattern. The information processing part 104 can process the inquiry information on the picking list 102C to reduce the processing time. For example, the picking list contains the items to be picked and arranged in the sequence from A, B, C, D, to E. The information processing part 104 can reorganize the picking list to be in a picking order according to the spatial arrangement/distance of the items. For example, a picking listed is generated having a picking sequence as A, D, E, B, and C, which is based on the spatial arrangement of the elements in the box 106B on the rack 106A. The spatial distances can be measured by the distance in 2D (x-y plane), 3D (x-y-z; space distance), and/or with time factors. For example, the processing part 104 can take into consideration a temporary box 106B with a new item is going to be added to the rack 106A in the next hour, such that the picking sequence can be adjusted and/or scheduled accordingly.

The information processing part 104 is able to command the lighting sequence/effects of the indicating system 110 on the rack 106A, such that the workers have visual indication/guidance to facilitate the picking process. With such advanced feature, the efficiency of the picking process is enhanced and the time for completing the task is reduced. For example, all the lights/displays 110A-110F of the indicating system 110 are in an "off" status before the processing part 104 sends commanding signals to the rack 106. The display 110A is turned to the status "On" when item A is indicted to be picked up. The "On" status of the display 110A can also show the number of the elements to be picked up, such as 3 units with a number 3 shown. Other display options are within the scope of the present invention. For example, the displays 110A, 110C, and 110E show a green light to indicate that the number of elements to be retrieved are not meet yet, 110B shows a blue light to indicate that the number of the element wanted has met, and 110D shows a red light to indicate that too many units have been retrieved and some units needs to be put back. In some embodiments, the displays can show the "live," "dynamic," or "right-at-this moment" inquiries. For example, a customer decides to cancel some of the elements in the process of picking or before the completion of the originally generated picking list. The processing part 104 can generate a command signal based on a live/current picking list to change the indication on the display. For example, a worker has picked up 5 units of item B from the box B. The system can change the lighting effects and requesting the worker to return 2 units when a 2 units canceling command is received by the information processing part 104.

In some embodiments, the lights 110A-110F are turned off or changed its status of indication after the entire order is completed. In some other embodiments, the lights are turned on and off along the progress of the picking process. For example, all need units are indicated on the lights 110A-110F before the beginning of the picking process. The lights 110A-110A are turned off along the completion of each of the items to be picked. In another example, the lights 110A-110F guide the picking person of the place and the number to pick one-by-one, such that only one of the 110A-110F lights is turned on until the picking person completed the picking requirement for that specific item and then the system turns off that light with the turning on of the next light in a predetermined order.

In some embodiments, the rack 106 comprises bar code scanner, video camera, surveillance camera, or any other monitoring/inventory devices. When an item, such as item A, is retrieved from the box A on the rack 106, a signal of the completion of fulfillment of the item A is sent back to the information processing part 104 for a dynamic/live picking list update.

In some embodiments, the rack 106 comprises a sensing device to check the stocking number of the elements in the boxes 106B on the rack 106A, such that the processing part 104 is able to request replenishing the box 106 from another inventory place, such as another larger warehouse. With such advanced feature, the boxes 106B can be replenished in time without running out of stocking of elements. In some embodiments, the elements being picked up are placed in the order box 108. The order box 108 can comprise sensors to verify if the quantity picked meets the quantity on the picking list.

In an operational method, the system turns on all the displays at the same time indicating the numbers of the items to be picked with a single bar code scan and operators takes the items to a work station.

Figure 3:
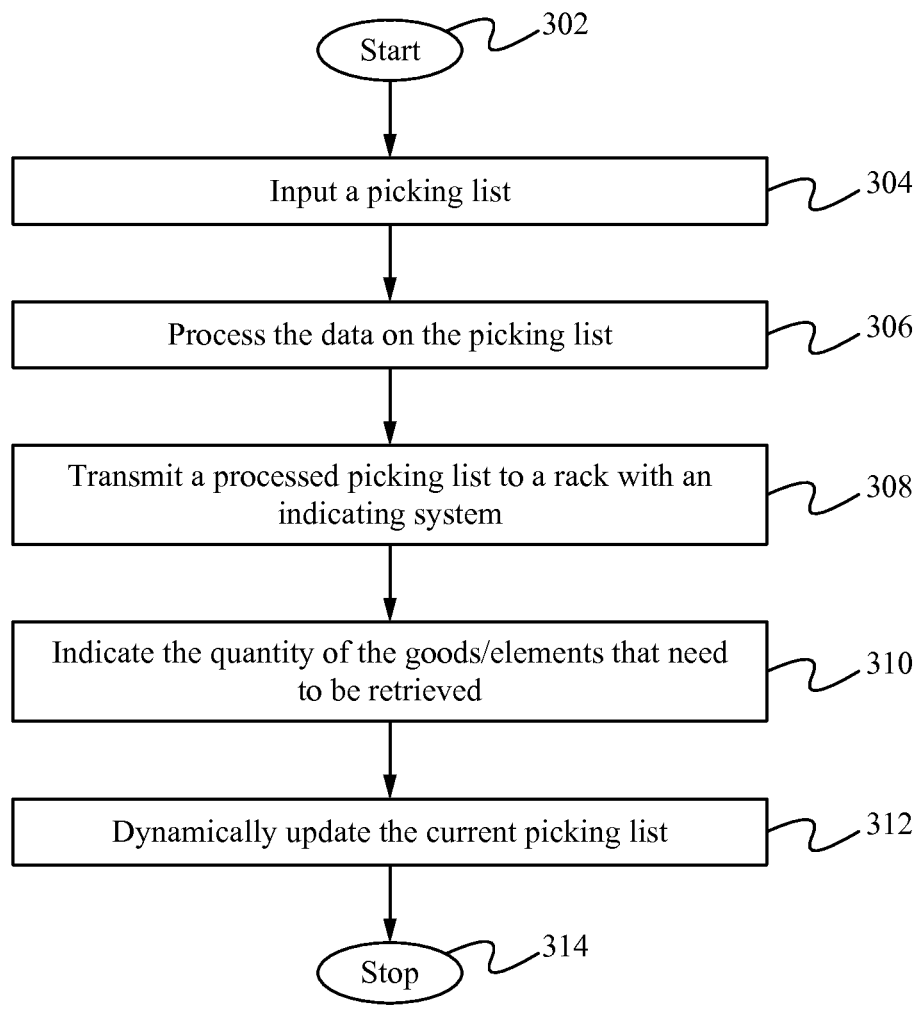
FIG. 3 is a flow chart illustrating a pick to light method in accordance with some embodiments of the present invention.

FIG. 3 is a flow chart illustrating a pick to light method 300 in accordance with some embodiments of the present invention.

The method 300 can start at Step 302. At Step 304, a picking list is inputted. At Step 306, the data/information on the packing list is processed. In some embodiments, the information of the packing list is converted to a format that can reduce the time needed to complete picking the items/goods needed. At Step 308, a processed picking list is transmitted to a rack with an indicating system. At Step 310, the quantity of the goods/elements to be retrieved is indicated by one or more indicators, such as lights with numbers. At Step 312, the live or current picking list is dynamically/interactively updated based on the products/goods/parts that are currently needed and that are currently picked. The method 300 can stop at Step 314.

To utilize the pick to light system, the picking list is installed in a logistic processing place, such as a warehouse, retail, automobile assembly, computer selling and manufacturing, pharmaceutical, and electronic stores.

In operation, the picking list is entered to an information system, the information is processed at a computing device, and the picking list is indicated by an indicating device, such as LED lights, number lights, lamps, or LCD display screen.

The present invention has been described in terms of specific embodiments incorporating details to facilitate the understanding of principles of construction and operation of the invention. Such reference herein to specific embodiments and details thereof is not intended to limit the scope of the claims appended hereto. It is readily apparent to one skilled in the art that other various modifications can be made in the embodiment chosen for illustration without departing from the spirit and scope of the invention as defined by the claims.

What is claimed is:

1. An inventory picking system comprising:
 a. a picking list information receiving device;
 b. a picking list information processing device coupled with the picking list information receiving device, wherein the picking list information processing device is configured to reorganize a picking list and generates a picking order based on a three-dimensional spatial order of dispensing containers and an availability of one or more items of the picking list; and
 c. one or more indicating devices coupled with each of the dispensing containers, an indication of a number items to be picked shown on the one or more indicating devices associated with the dispensing containers, wherein the indicating devices indicates a dynamic live inquiry.

2. The system of claim 1, wherein the picking list receiving device comprises a bar code reader.

3. The system of claim 1, wherein the picking list receiving device comprises a camera.

4. The system of claim 1, wherein the picking list receiving device comprises an order processing software.

5. The system of claim 1, wherein the dispensing container comprises a sensing device sensing a quantity of the item remained in the dispensing containers.

6. The system of claim 1, wherein the dispensing container comprises a sensing device sensing a quantity of the item that is removed from the dispensing container.

7. The system of claim 1, wherein the picking list information processing device converts information of the picking list to an identifiable signal at the one or more indicating devices.

8. The system of claim 7, wherein the identifiable signal comprises a numerical number.

9. The system of claim 7, wherein the identifiable signal comprises a lighting effect.

10. The system of claim 9, wherein the lighting effect indicates that a needed quantity is obtained.

11. The system of claim 9, wherein the lighting effect indicates that a needed quantity is less than a quantity obtained.

12. The system of claim 9, wherein the lighting effect indicates that a needed quantity is more than a quantity obtained.

13. An order fulfilling method comprising:
 a. receiving an order with one or more items to gather;
 b. generating an identifiable signal on a selected location on a stocking shelf based on the one or more items to gather, wherein the identifiable signal indicates a dynamic live inquiry;
 c. changing the identifiable signal once a quantity needed for the one or more of the items to gather is retrieved; and
 d. reorganizing a picking list to generate a picking order based on a three-dimensional spatial order of stocking shelves and an availability of an item of the one or more number of items to gather.

14. The method of claim 13, wherein the order is entered via a bar code reader.

15. The method of claim 13, wherein the identifiable signal comprises a LED lighting effect.

16. The method of claim 13, wherein the identifiable signal comprises a number.

17. The method of claim 13, wherein the changing comprises turning off.

18. An order fulfilling apparatus comprising:
 a. a working station;
 b. one or more shelves on the working station;
 c. containers on the one or more shelves;
 d. a numerical indicating device associated with each of the containers; and
 e. an information processing device configured to generate an identifiable signal on the numerical indicating devices based on a received picking list, wherein the identifiable signal indicates a dynamic live inquiry, wherein the information processing device is configured to reorganize the picking list to a picking order based on a three-dimensional spatial order of the containers and an availability of one or more items of the picking list.

19. The apparatus of claim 18, further comprises a picking order sorting device configured to generate the picking list that improves picking efficiency.

20. The apparatus of claim 19, wherein the picking list generated is determined based on the physical distance among the containers.

* * * * *

UNITED STATES PATENT AND TRADEMARK OFFICE
CERTIFICATE OF CORRECTION

PATENT NO.       : 9,758,303 B2
APPLICATION NO.  : 14/171676
DATED            : September 12, 2017
INVENTOR(S)      : Fernando Antonio Sanchez Marquez Page 1 of 1

It is certified that error appears in the above-identified patent and that said Letters Patent is hereby corrected as shown below:

On the Title Page

Item (60) (Related U.S. Application Data) should read -- Provisional application No. 61/760,588, filed on Feb. 4, 2013 --.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*